United States Patent [19]

Eakman

[11] 4,250,160
[45] Feb. 10, 1981

[54] PRODUCTION OF AMMONIUM SULFATE

[75] Inventor: James M. Eakman, Houston, Tex.

[73] Assignee: Exxon Research & Engineering Co., Florham Park, N.J.

[21] Appl. No.: 824,456

[22] Filed: Aug. 15, 1977

Related U.S. Application Data

[63] Continuation of Ser. No. 700,738, Jun. 29, 1976, abandoned.

[51] Int. Cl.³ .......................... C01C 1/24; C01B 17/00
[52] U.S. Cl. .................................... 423/547; 423/545; 423/242; 423/237
[58] Field of Search ................ 423/237, 242, 545, 547

[56] References Cited

U.S. PATENT DOCUMENTS

| | | | |
|---|---|---|---|
| 1,508,736 | 9/1924 | West et al. ............................. | 423/547 |
| 1,931,408 | 10/1933 | Hodsman et al. ..................... | 423/242 |
| 1,934,573 | 11/1933 | Van Peske ............................ | 423/545 |
| 1,986,889 | 1/1935 | Fulton .................................... | 423/547 |
| 1,986,899 | 1/1935 | Sperr, Jr. ............................... | 423/547 |
| 1,992,681 | 2/1935 | Von Girsewald ..................... | 423/547 |
| 2,095,074 | 10/1937 | Muus .................................... | 423/547 |

FOREIGN PATENT DOCUMENTS 377504 7/1932 United Kingdom ..................... 423/547
1031724 6/1966 United Kingdom ..................... 423/545

*Primary Examiner*—Herbert T. Carter
*Assistant Examiner*—Gary P. Straub
*Attorney, Agent, or Firm*—L. A. Proctor; Y. S. Finkle

[57] ABSTRACT

A process for the production of ammonium sulfate in a multistage contactor (or column) inclusive of liquid cyclone recycle. A gas, or gases, which contains sulfur dioxide, e.g., a flue gas, is contacted with ammonia in an oxygen and water environment in a column comprised of three sections (zones). Sulfur dioxide is contacted in vapor phase in a central section of the contactor with a stoichiometric excess of ammonia in the presence of oxygen and water vapor to produce ammonium sulfate. A scrubbing section for the removal of ammonia from the effluent gas by countercurrent contact with water or acid solution is provided in the upper section of the contactor. Liquid cyclones are utilized in the lower section of the contactor where product ammonium sulfate is removed as a slurry, crystalline ammonium sulfate is removed from the slurry, and liquid is returned as recycle to the contactor.

9 Claims, 1 Drawing Figure

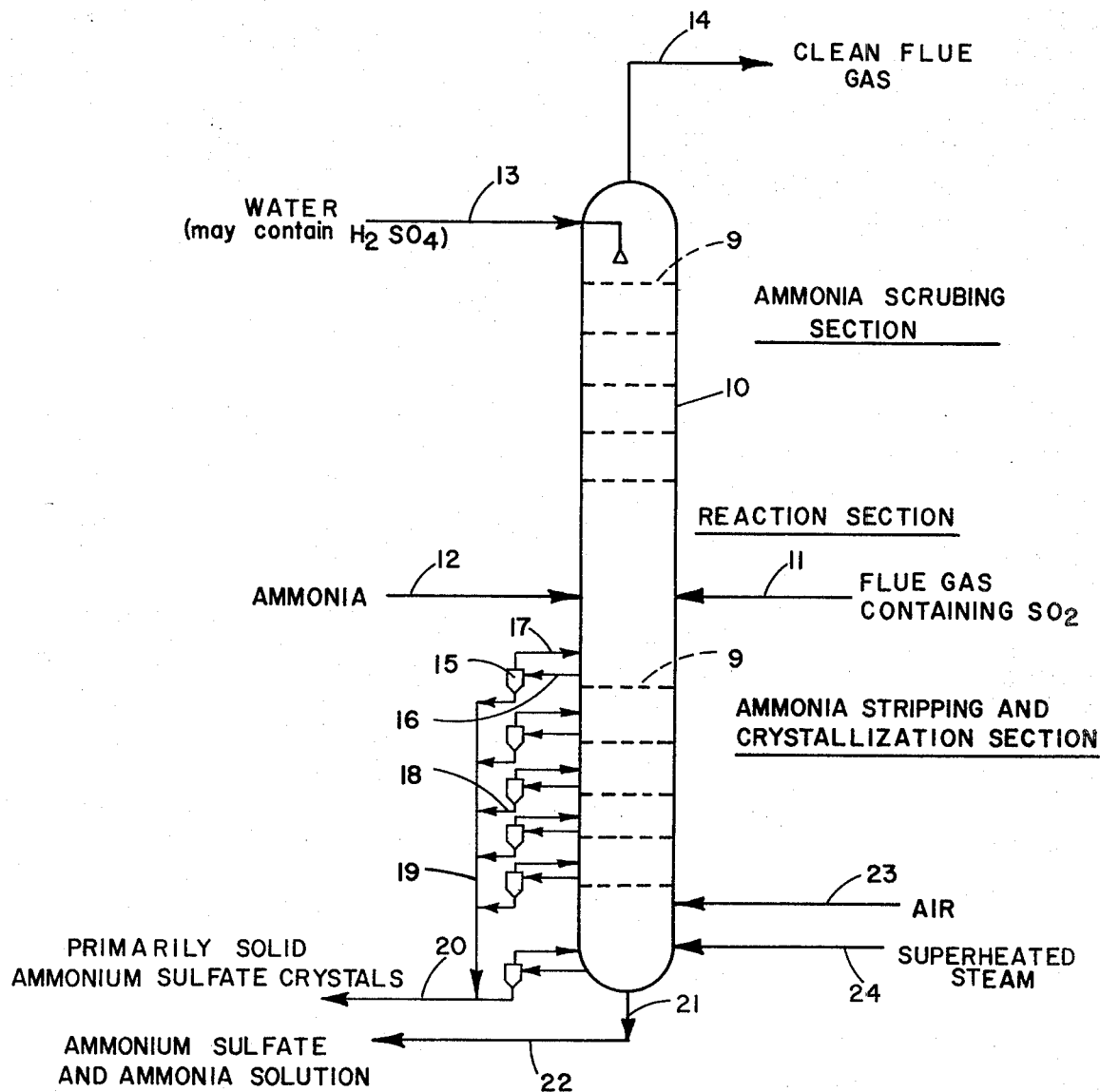

PRODUCTION OF AMMONIUM SULFATE

This is a continuation, of application Ser. No. 700,738, filed June 29, 1976 now abandoned.

Gaseous effluents, waste gases, flue gases and the like from various industrial sources often include components which must be removed, e.g., sulfur oxides, notably sulfur dioxide. Sulfur dioxide, a very harmful air pollutant, and ammonia often occur in effluents, often in admixture with other gaseous components. Coal gasification plants commonly emit effluent gas streams which contain sulfur dioxide or ammonia. The removal of these components from gases to suppress air pollution is highly desirable, and generally essential.

Processes for the production of ammonium sulfate are well known. Ammonium sulfate is often formed by contact between sulfur oxide containing flue gases and ammoniacal solutions, the ammonium sulfate being formed as crystals and precipitated from solution. (See, e.g., Defensive Publication No. T909,017 to Jordan et al.) Ofttimes the primary purpose in the operation of such processes is to produce ammonium salts, but often also the primary purpose is to reduce air pollution.

In U.S. Pat. No. 3,186,802 to J. S. Gerrard, e.g., a process is disclosed for the removal of sulfur oxide from waste, or flue gas, by contact of the gas with ammonia. In a reaction vessel, an incoming acidified feed liquor is mixed with a recirculated sulfuric acid containing stream producing a reaction in which ammonium sulfite and ammonium bisulfite are converted to ammonium sulfate and sulfur. Small amounts of sulfuric acid are used to scrub trace amounts of ammonia from the flue gas.

In U.S. Pat. No. 3,843,789 to Spector et al a process is disclosed for the removal of sulfur dioxide from flue gas by contact of the gas with an ammonia solution. The flue gas is introduced into the lower portion of a column while the ammonia solution is introduced into the upper portion of the column, the ammonia reacting with the sulfur dioxide to produce ammonium sulfite. The essential purpose of this process is to remove the sulfur dioxide to reduce air pollution.

The primary objective of the present invention is to provide a new and improved process for the separation and removal of sulfur oxides or ammonia, or both, from gaseous streams for the suppression of air pollution or to produce useful by-products, or both.

A more particular object of this invention is to provide a process wherein sulfur dioxide can be separated from waste gas, or flue gas streams by contact with ammonia in a multiple stage liquid-vapor contactor, column or reactor.

Another and more specific object of this invention is to provide a process for the more effective separation of sulfur dioxide from flue gas streams, notably by contact with ammonia in a multiple stage liquid-vapor contact column, contactor or reactor.

These objects and others are achieved in accordance with the present invention, characterized as a process for the separation of sulfur dioxide from a gaseous stream, notably a waste gas or flue gas stream, by contact of the gaseous stream with ammonia, which can also be a waste gas stream, in the presence of oxygen and water, in a multiple stage liquid-vapor contactor, or contact device comprised of at least three sections (or zones). In the contactor, in a central section, sulfur dioxide is contacted in vapor phase with an excess of ammonia in the presence of oxygen and water vapor to produce ammonia sulfate. In an upper section of the contactor, excess ammonia is scrubbed from the effluent gas by countercurrent contact with water or acid solution. Liquid cyclones are utilized in the lower section of the contactor, product ammonium sulfate in crystalline form being removed from the lower section of the contactor. A slurry of ammonium sulfate is removed from the bottom stages of the contactor, crystalline ammonium sulfate is separated from the slurry, and the mother liquor is recycled to the contactor.

In its preferred aspects, the contactor is comprised of three functional sections (or zones). The feed streams to the contactor are comprised of ammonia; a flue gas containing sulfur dioxide which may also contain nitrogen, carbon dioxide, oxygen, and oxides of nitrogen; an air stream to supply any needed excess oxygen requirements; a water stream which may contain a small amount of sulfuric acid to scrub trace amounts of ammonia from the flue gas; and superheated stream to vaporize water and concentrate the ammonium sulfate solution. The several functions which take place within the sections of the contactor are generally as follows: The primary purpose of the central section is to provide vapor phase contact between the sulfur dioxide and ammonia, the sulfur dioxide being reacted with an excess concentration of ammonia in the presence of excess oxygen and water vapor to produce ammonium sulfate. Temperature and pressure are not critical. The overall stoichiometry of the very rapid vapor phase reactions involved in such reaction is represented by the following equation:

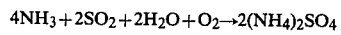

$$4NH_3 + 2SO_2 + 2H_2O + O_2 \rightarrow 2(NH_4)_2SO_4$$

The ammonium sulfate forms immediately and crystallizes as a solid.

In order to obtain an essentially stoichiometric conversion of the reactants to ammonium sulfate without the production of by-products such as ammonium sulfamate (a herbicide), the molar ratio of ammonia:sulfur dioxide should be approximately 2.3:1, or greater. Preferably, the higher concentration of ammonia in the central section is maintained by the functions carried out in the scrubbing an stripping sections of the column.

The primary function of the upper ammonia scrubbing section is the removal of ammonia from the flue gas effluent. A small amount of sulfuric acid can be added to water which is fed to the top of the scrubbing section to neutralize and remove the residual amounts of ammonia so that an essentially ammonia-free stream leaves the top of the scrubber.

The primary function of the lower section of the contactor is to strip the ammonia from the liquid, to concentrate the ammonium sulfate, and to separate the crystallized ammonium sulfate from solution. The lower section of the contactor can be operated in various modes which include: (a) removal of primarily solid ammonium sulfate crystal streams, (b) removal of an ammonium sulfate solution which also contains ammonia from the bottom of the column, which is the preferred mode of operation, and (c) removal of the primarily solid ammonium sulfate crystal streams with no significant liquid phase removal. The removal of the water from the product to concentrate the solution is accomplished by means of vaporization, superheated steam, or unsaturated gas, e.g., heated air, or both, being fed to the bottom of the contactor to strip out the water vapor.

The process is carried out in vapor-liquid contacting apparatus utilizing conventional components. These and other features of the present process will be illustrated, and consequently better understood, by reference to the attached drawing, the following description, and illustrations which make reference to the drawing.

The FIGURE depicts vapor-liquid contacting apparatus in schematic form, and an arrangement of the apparatus and associated apparatus components adapted to carry out the present process.

Referring to the FIGURE, there is shown a contact column, or Column 10, of the vapor-liquid contact type constituted generally of an outer metal shell within which can be provided a plurality of vertically separated trays 9. The contactor 10 is comprised generally of an upper ammonia scrubbing section, a central reaction section and a lower ammonia stripping and crystallization section. Gaseous feeds, a first containing sulfur dioxide, e.g., a flue gas, is introduced via line 11 into the center of the contactor 10, or into the reactor section. A second gaseous feed comprising an ammonia containing stream is also introduced via line 12 into about the center of Column 10. In the ensuing vapor phase reaction, wherein ammonia is present in stoichiometric excess relative to the sulfur dioxide, suitably in molar ratio of $NH_3:SO_2$ of 2.3:1, or greater, ammonium sulfate is produced substantially in accordance with the following equation:

$$4NH_3 + 2SO_2 + 2H_2O + O_2 \rightarrow 2(NH_4)_2SO_4$$

Ammonia gas ascends within the column, and an ammonia sulfate solution or slurry descends through the lower section to the bottom of the column.

In any given stage, liquid and vapor phases are present. A solid phase is also present in the lower section of the column. Each of the several stages at the lower portion of Column 10, it will be observed, is provided with liquid cyclones or hydroclone separators 15. The primary function of the lower section of Column 10 is to strip ammonia from the liquid, concentrate the ammonium sulfate and to separate the crystallized ammonium sulfate from solution. In operation, heated air or superheated steam, or both, are injected into the bottom of Column 10 via lines 23,24, respectively. A mixed, primarily liquid and solid phase is withdrawn from one or more of a plurality of trays 9 at the lower section of Column 10 via lines 16, and fed into liquid cyclones, or hydroclones, 15 wherein separation of the liquid and solid phases is effected. A primarily liquid stream is returned to the Column 10 via a line 17, and to a tray 9 from which it was withdrawn. Very small solid particles, which generally range below about 20 microns in diameter, are recycled with the liquid and serve as nucleation sites for further crystal growth. The larger solid particles comprising primarily solid ammonium sulfate crystals, on subsequent passage, are separated from the liquid and passed via line 18 to an appropriate manifold 19. The solid phase in the manifold 19 is passed to line 20 and removed from the process. Ammonium sulfate and ammonia solution are removed via lines 21,22 from the bottom stage of the column.

Within the ammonia scrubbing section, which may consist of packing or trays 9, water or dilute sulfuric acid solution is added to the top of Column 10 via line 13 to remove or neutralize the ammonia. An essentially ammonia- and sulfur dioxide-free, or clean, flue gas stream is taken from the top of the Column 10 via line 14.

It is apparent that various modifications and changes can be made without departing the spirit and scope of the present invention.

Having described the invention, what is claimed is:

1. A process for simultaneously producing ammonium sulfate and removing sulfur dioxide from a sulfur dioxide-containing gas in a distillation column comprised of an upper ammonia scrubbing zone, a central reaction zone, and a lower stripping and crystallization zone that contains at least one vapor-liquid contact tray which comprises:
   (a) introducing a sulfur dioxide-containing gas and ammonia into said central reaction zone wherein sulfur dioxide, ammonia, water and oxygen react to form an ammonium sulfate-containing solution which flows downward into said lower stripping and crystallization zone;
   (b) introducing water into the upper ammonia scrubbing zone of said distillation column, said water scrubbing the ascending gases as it flows downward into said central reaction zone;
   (c) withdrawing a substantially ammonia and sulfur dioxide-free gas overhead from said distillation column;
   (d) introducing an oxygen-containing gas into the bottom of the lower stripping and crystallization zone of said distillation column;
   (e) supplying heat to said distillation column;
   (f) withdrawing a slurry stream of liquid and ammonium sulfate solids from each vapor-liquid contact tray on which such a slurry exists in said lower stripping and crystallization zone;
   (g) separating a substantial portion of said ammonium sulfate solids from each slurry stream withdrawn from each vapor-liquid contact tray to produce a liquid stream depleted in ammonium sulfate solids; and
   (h) returning each liquid stream produced from each slurry stream in step (g) to the vapor-liquid contact tray from which the slurry stream was originally withdrawn.

2. A process as defined by claim 1 wherein the water introduced into said upper ammonia scrubbing zone contains sulfuric acid.

3. A process as defined by claim 1 wherein a sufficient amount of ammonia is introduced into said central reaction zone to provide a molar ratio of ammonia to sulfur dioxide of at least about 2.3:1.

4. A process as defined by claim 1 wherein said ammonia introduced into said central reaction zone is contained in a waste gas stream.

5. A process as defined by claim 1 wherein said sulfur dioxide-containing gas introduced into said central reaction zone comprises a flue gas.

6. A process as defined by claim 1 wherein said oxygen-containing gas introduced into the bottom of said stripping and crystallization zone comprises air.

7. A process as defined by claim 1 wherein a hydroclone is utilized to separate said ammonium sulfate solids from each slurry stream withdrawn in step (f).

8. A process as defined by claim 1 wherein said heat is supplied to said distillation column in said oxygen-containing gas.

9. A process as defined by claim 1 wherein said heat is supplied to said distillation column by introducing superheated steam into the bottom of said stripping and crystallization zone.

* * * * *